United States Patent
Shiozaki et al.

(10) Patent No.: US 6,965,475 B2
(45) Date of Patent: Nov. 15, 2005

(54) OPTICAL COMPONENT, OPTICAL DEVICE AND OPTICAL COMMUNICATIONS SYSTEM

(75) Inventors: Manabu Shiozaki, Yokohama (JP); Masakazu Shigehara, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 58 days.

(21) Appl. No.: 10/809,884

(22) Filed: Mar. 26, 2004

(65) Prior Publication Data

US 2005/0128591 A1    Jun. 16, 2005

Related U.S. Application Data

(60) Provisional application No. 60/457,933, filed on Mar. 28, 2003.

(30) Foreign Application Priority Data

Mar. 28, 2003  (JP) ............................ P2003-090764

(51) Int. Cl.[7] ............................ G02B 27/44; G02B 5/18
(52) U.S. Cl. .................................... 359/566; 359/569
(58) Field of Search ................................ 359/566, 569, 359/563, 558, 837

(56) References Cited

U.S. PATENT DOCUMENTS 5,101,458 A * 3/1992 Spaulding et al. ............ 385/36
5,420,947 A * 5/1995 Li et al. ...................... 385/37
5,457,573 A * 10/1995 Iida et al. .................... 359/569
5,652,681 A * 7/1997 Chen et al. .................. 359/831
6,693,745 B1 * 2/2004 Kondis et al. ............... 359/569
2003/0099433 A1 * 5/2003 Wong et al. .................. 385/24

FOREIGN PATENT DOCUMENTS

WO    WO 01/20372 A2    3/2001
WO    WO 01/95537 A2    12/2001

OTHER PUBLICATIONS

Kashiko Kodate, "Development of Diffractive Optics and Future Challenges"; *Japan Woman's University Bulletin, Department of Mathematics and Physical Sciences*; c. 2002; pp. 7-24; vol. 10.

* cited by examiner

Primary Examiner—Leonidas Boutsikaris (74) Attorney, Agent, or Firm—McDermott Will & Emery LLP

(57) ABSTRACT

The present invention relates to an optical component and the like having a structure that can increase the absolute value of the angular dispersion, and also can reduce the temperature dependence of the diffraction angle. The optical component comprises a diffraction grating element of a transmissive type and a prism. The prism is composed of a material with a refractive index of $n_1$, and the diffraction grating element and the prism are surrounded a material with a refractive index of $n_0$.

14 Claims, 4 Drawing Sheets

OPTICAL COMPONENT, OPTICAL DEVICE AND OPTICAL COMMUNICATIONS SYSTEM

This application claims priority from U.S. Provisional Patent Application No. 60/457,933, filed on Mar. 28, 2003 which is hereby incorporated by reference in its entirety.

BACKGROUND OF THE INVENTION

1. Field of the Invention

The present invention relates to an optical component including a diffraction grating element, an optical device including the optical component, and an optical communications system including the optical device.

2. Related Background Art

A diffraction grating element comprises a transparent flat plate, and a diffraction grating formed on one surface of the flat plate or formed within the flat plate in parallel with the one surface (see, for example, Kashiko Kodate "Development of Diffractive Optics and Future Challenges", Bulletin of the Japan Women's University, Department of Science, Vol. 10, pp. 7–24, (2002)). In the diffraction grating element, light incident on the diffraction grating is diffracted by the diffraction grating. The diffraction angle of the light in this case differs in accordance with the wavelength of light. In other words, when light with a wavelength $\lambda$ is introduced into a diffraction grating of grating period $\Lambda$ at an incident angle of $\theta_0$, then the emission angle $\theta_1$ of the mth-order diffracted light, emitted from the diffraction grating, is expressed by the following Formula (1), and it differs in accordance with the wavelength $\lambda$.

$$\theta_1 = \sin^{-1}\left(\sin\theta_0 + \frac{m\lambda}{n_0\Lambda}\right) \quad (1)$$

Here $n_0$ is the refractive index of the material surrounding the diffraction grating element.

In this way, thus diffraction grating element can be used as an optical demultiplexer for demultiplexing the incident light. Additionally, the diffraction grating element, in the case that the light is introduced in an opposite direction to that described above, can be used as an optical multiplexer for multiplexing components of the incident light. Moreover, by combining a diffraction grating element and another optical element, for example, it is possible to obtain a dispersion adjuster for adjusting the group delay time of light in accordance with the wavelength thereof. Consequently, diffraction grating elements are one of important optical components in WDM (Wavelength Division Multiplexing) optical communications systems, which transmit the multiplexed signal light of multiple wavelengths.

Furthermore, in thus diffraction grating element, the greater the absolute value of the angular dispersion $D_g$ (the wavelength dependence of the diffraction angle $\theta_1$), then the more desirable it is in terms of the capacity to perform light multiplexing or demultiplexing readily. Here, the angular dispersion $D_g$ is expressed by the following Formula (2).

$$D_g = \frac{\partial \theta_1}{\partial \lambda} = \frac{m}{n_0 \Lambda \cos\theta_1} \quad (2)$$

SUMMARY OF THE INVENTION

The inventors have studied conventional optical components in detail, and as a result, have found problems as follows. Namely, even when the wavelength and incident angle of the light incident on a diffraction grating element are fixed, the diffraction angle thereof varies depending on the temperature. In the case that such an element is used in a WDM optical communications system, when the diffraction angle of the diffraction grating element varies, then as a result of this variation, the loss of the signal light will increase, or the waveform of the signal light will be degraded, and a communications error may occur. In order to suppress thus communications errors, conventionally, it has been necessary to provide an active temperature control mechanism for controlling the temperature of the diffraction grating element to a fixed temperature. However, providing a temperature control mechanism causes an increase in system costs, and further increase in system costs is also produced by the necessity of supplying electrical power to this temperature control mechanism.

As can be seen from the above-mentioned Formula (2), it can be considered, in order to increase the absolute value of the angular dispersion, to increase the order m of diffraction or the diffraction angle $\theta_1$, and furthermore to decrease the grating period $\Lambda$. However, in the former case, the diffraction efficiency declines, and in the latter case, the diffraction grating becomes more difficult to process, and hence there have been limits on the amount to which the absolute value of the angular dispersion can be increased. More particularly, in a conventional diffraction grating element, it has not been possible to achieve both of the reduction of the temperature dependence of the diffraction angle, and the increase in the absolute value of the angular dispersion.

The present invention was devised in order to resolve the aforementioned problems, an object thereof being to provide an optical component which allows the absolute value of the angular dispersion to be increased, whilst also allowing the temperature dependence of the diffraction angle to be reduced.

The optical component according to the present invention comprises a diffraction grating element of transmissive type, and a prism. The diffraction grating element has a flat plate, and a diffraction grating is formed on one surface of the flat plate or formed within the flat plate in parallel with the one face thereof. The prism is composed of a medium with a refractive index of $n_1$, and has a first surface on which the light diffracted by the diffraction grating element is incident and a second surface from which the light having passed through the first surface is emitted. In particular, the optical component according to the present invention is characterized in that the diffraction grating element and the prism are provided within a medium with a refractive index of $n_0$. Furthermore, the optical component according to the present invention is characterized in that, in the case that light with a wavelength $\lambda$ is incident on the diffraction grating element at an incident angle of $\theta_0$, then taking the incident angle of the light incident on the first surface of the prism, from the diffraction grating element, to be $\theta_2$, taking the emission angle of the light emitted from the second surface of the prism to be $\theta_5$, taking the temperature coefficient of the diffraction angle in the diffraction grating element to be $F_g$, taking the temperature coefficient of the emission angle $\theta_5$ of the light emitted from the second surface of the prism, assuming that the incident angle $\theta_2$ of the light incident on the first surface of the prism is fixed regardless of the temperature, to be $F_p$, and taking the magnification rate of the angular dispersion caused by the prism to be $M_p$, the diffraction grating element and the prism are arranged such that the wavelength $\lambda$ and the incident angle $\theta_0$ satisfy the following relationship "$n_1 > n_0$ AND $|\theta_5| > |\theta_2|$" or
"$n_1 < n_0$ AND $|\theta_5| < |\theta_2|$",
whilst also satisfy the following relationship
"$-2M_p F_g < F_p < 0$" or
"$-2M_p F_g > F_p > 0$".

The optical component having thus configuration can reduce the temperature dependence of the emission angle $\theta_5$ in accordance with the increase of the absolute value of the angular dispersion of the emission angle $\theta_5$. Here, the diffraction grating element and the prism may be mutually separated by a predetermined distance, by means of the medium with the refractive index of $n_0$. Moreover, the diffraction grating element may be attached to the first surface of the prism by means of an adhesive.

Desirably, the wavelength $\lambda$ is within the used wavelength band of the optical component. For example, when the optical component is used for optical communications, then the wavelength $\lambda$ is preferably included within the wavelength band of 1.26 $\mu$m to 1.675 $\mu$m, and in particular, preferably, it is included within the C-band (wavelength 1.53 $\mu$m to 1.565 $\mu$m) or within the L-band (wavelength 1.565 $\mu$m to 1.625 $\mu$m). Moreover, it is preferable that the above-mentioned relationships are satisfied within the temperature range of the environment in which the optical component is used. For example, when the optical component is used in optical communications, then the above-mentioned relationships are preferably satisfied within the temperature range of −20° C. to +80° C.

Also, the optical component according to the present invention preferably satisfy the following relationship at any temperature within the temperature range of −20° C. to +80° C., and in this case, the temperature coefficient of the emission angle $\theta_5$ may be zero at any temperature within the temperature range.

"$F_p = -M_p F_g$"

In the optical component according to the present invention, taking the temperature coefficient of the emission angle $\theta_5$ of the light emitted from the second surface of the prism to be $F_t$, and taking the angular dispersion of the emission angle $\theta_5$ to be $D_t$, preferably, the absolute value of the ratio $(F_t/D_t)$ is less than 0.4 pm/° C. at any temperature within the temperature range of −20° C. to +80° C., and in this case, the optical component is suitable for use in optical communications wherein the optical frequency spacing of the signal light is 100 GHz. Moreover, further preferably, the absolute value of the ratio $(F_t/D_t)$ is less than 0.2 pm/° C., and in this case, the optical component is suitable for use in optical communications wherein the optical frequency spacing of the signal light is 50 GHz.

In the optical component according to the present invention, taking the angular dispersion of the diffraction grating element to be $D_g$, taking the temperature coefficient of the angular dispersion $D_g$ to be $G_g$, and taking the temperature coefficient of the magnification rate $M_p$ of the angular dispersion caused by the prism to be $H_t$, then, it is preferable that the following relationship is satisfied.

"$-2M_p G_g < H_t D_g < 0$" or
"$-2M_p G_g > H_t D_g > 0$"

In this case, the temperature dependence of the angular dispersion $D_t$ of the emission angle $\theta_5$ can be reduced. Moreover, it is preferable that the following relationship is satisfied at any temperature within the temperature range of −20° C. to +80° C.

"$-M_p G_g = H_t D_g$"

In this case, the temperature coefficient of the angular dispersion $D_t$ can be made zero at any temperature within the aforementioned temperature range.

In the optical component according to the present invention, taking the grating period of the diffraction grating to be $\Lambda$, it is preferable that the temperature coefficient of the product $(n_0 \Lambda)$ has a negative value, and that the temperature coefficient of the ratio $(n_1/n_0)$ has a negative value. Moreover, in the optical component according to the present invention, the prism is preferably composed of a semiconductor, and preferably, this semiconductor is silicon. This is advantageous in terms of increasing the absolute value of the angular dispersion $D_t$ of the emission angle $\theta_5$, whilst also reducing the temperature dependence of the emission angle $\theta_5$, and furthermore, it is also advantageous in terms of reducing the temperature dependence of the angular dispersion $D_t$.

The optical device according to the present invention includes an optical component having the above-mentioned configuration (the optical component according to the present invention), and is characterized by multiplexing or demultiplexing light by using the optical component. Preferably, the optical device according to the present invention further comprises a housing hermetically sealing the optical component therein. The optical communications system according to the present invention includes an optical device having the above-mentioned configuration (the optical device according to the present invention), and is characterized by transmitting signal light therethrough, and multiplexing or demultiplexing the signal light by using the optical device. Since the optical device includes an optical component having a large angular dispersion and low temperature dependence, it can be made compact in size, and furthermore, it becomes unnecessary to provide a temperature control mechanism, or, the temperature control mechanism can be simplified.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DETAILED DESCRIPTION OF THE PREFERRED EMBODIMENTS

In the following, embodiments of an optical component, an optical device and an optical communications system according to the present invention will be explained in detail with reference to FIGS. 1 to 6. In the explanation of the drawings, constituents identical to each other will be referred to with numerals identical to each other without repeating their overlapping descriptions. Moreover, in order to simplify the description, an xyz-coordinates system is depicted on each of the drawings. Moreover, in the following, each wavelength dependence of the refractive indices $n_0$ and $n_1$ is ignored because it sufficiently smaller than the angular dispersion of the diffraction grating.

Figure 1:
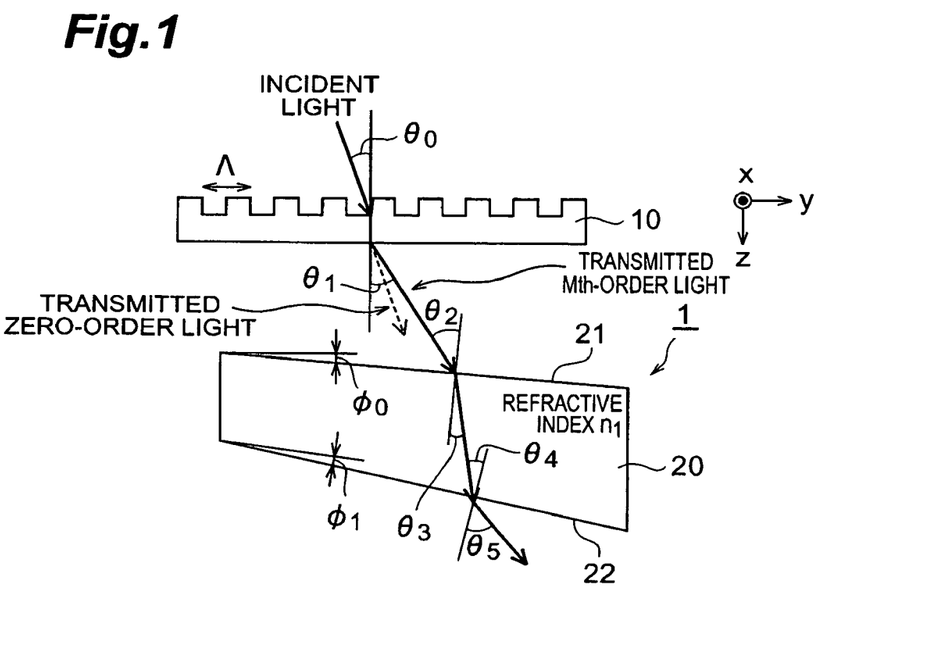
FIG. 1 is a view showing a configuration of a first embodiment of an optical component according to the present invention.

Firstly, embodiments of an optical component according to the present invention will be explained. FIG. 1 is a view showing a configuration of a first embodiment of the optical component according to the present invention. The optical component 1, as shown in FIG. 1, comprises a diffraction grating element 10, a prism 20, and a medium of refractive index $n_0$ surrounding these elements. The diffraction grating element 10 comprises a flat plate, and a diffraction grating with a grating period $\Lambda$ which is formed on one surface (the upper face) of a transparent flat plate having two parallel surfaces in the xy-plane. The respective bars or grooves formed in periodic fashion in the diffraction grating extend in a direction parallel to the x-axis. The prism 20 is composed of a transparent material with a refractive index of $n_1$, and it has a first surface 21 facing the diffraction grating element 10 and a second surface 22, which are not mutually parallel. The first surface 21 and the second surface 22 are respectively parallel to the x-axis.

In thus optical component 1, the tilted angle of the first surface 21 with respect to the xy-plane is represented by $\phi_0$ and the tilted angle of the second surface 22 with respect to the first surface 21 is represented by $\phi_1$. In other words, the second surface 22 is inclined at an angle of $(\phi_1+\phi_2)$ with respect to the xy-plane. Moreover, the wavelength of the light introduced into the diffraction grating element 10 is represented by $\lambda$, the incident angle of the light introduced to the diffraction grating element 10 is represented by $\theta_0$, the emission angle of the mth-order diffracted light emitted from the diffraction grating element 10 is represented by $\theta_1$, the incident angle of the light incident on the first surface 21 of the prism 20 is represented by $\theta_2$, the refracted angle of the light refracted at the first surface 21 of the prism 20 is represented by $\theta_3$, the incident angle of the light reaching the second surface 22 from the interior of the prism 20 is represented by $\theta_4$, and the emission angle of the light emitted from the second surface 22 of the prism 20 is represented by $\theta_5$. The angles $\phi_0$, $\phi_1$, $\theta_0$ to $\theta_5$, and the diffraction order m, are respectively positive in the direction illustrated in the drawings.

The thermal coefficient $F_g$ of the diffraction angle $\theta_1$ of the diffraction grating element 10, and the thermal coefficient $G_g$ of the angular dispersion $D_g$ (see the formula (2)) are respectively expressed by the following formulas (3) and (4).

$$F_g = \frac{\partial \theta_1}{\partial T} = -\frac{\lambda D_g}{n_0 \Lambda} \frac{d}{dT}(n_0 \Lambda) \tag{3}$$

$$G_g = \frac{\partial D_g}{\partial T} = \left(\frac{1}{\lambda} + D_g \tan\theta_1\right) F_g \tag{4}$$

Here, T is the temperature variable.

Moreover, the following formulas (5a) to (5e) can be established between the angles $\phi_0$, $\phi_1$, and $\theta_0$ to $\theta_5$.

$$\sin\theta_1 = \sin\theta_0 + \frac{m\lambda}{n_0 \Lambda} \tag{5a}$$

$$\theta_2 = \theta_1 + \phi_0 \tag{5b}$$

$$n_1 \sin\theta_3 = n_0 \sin\theta_2 \tag{5c}$$

$$\theta_4 = \theta_3 + \phi_1 \tag{5d}$$

$$n_0 \sin\theta_5 = n_1 \sin\theta_4 \tag{5e}$$

The angular dispersion $D_t$ of the emission angle $\theta_5$ of the light emitted from the second surface 22 of the prism 20 is expressed by the following formula (6).

$$D_1 = \frac{\partial \theta_5}{\partial \lambda} = M_p D_g \tag{6}$$

Here, $M_p$ is the ratio between the angular dispersion $D_t$ of the emission angle $\theta_5$, and the angular dispersion $D_g$ of the emission angle $\theta_1$, in other words, the rate of magnification of the angular dispersion caused by the prism 20, and $M_p$ is expressed by the following formula (7).

$$M_p = \frac{\cos\theta_2 \cos\theta_4}{\cos\theta_3 \cos\theta_5} \tag{7}$$

When the absolute value of the magnification rate $M_p$ of the angular dispersion caused by the prism 20 is greater than 1, then this means that the angular dispersion $D_t$ of the emission angle $\theta_5$ of the light emitted from the prism 20 is greater than the angular dispersion $D_g$ of the emission angle $\theta_1$ of the light emitted from the diffraction grating element 10. The conditions for achieving this are expressed by the following formula (8).

$$(\cos\theta_2\cos\theta_4)^2 - (\cos\theta_3\cos\theta_5)^2 = \frac{1}{n_1^2}(n_1^2 - n_0^2)(\sin^2\theta_5 - \sin^2\theta_2) > 0 \tag{8}$$

Furthermore, from the formula (8), the following relationship (9a) or (9b) can be derived.

$$n_1 > n_0 \text{ AND } |\theta_5| > |\theta_2| \tag{9a}$$

$$n_1 < n_0 \text{ AND } |\theta_5| < |\theta_2| \tag{9b}$$

As shown by the formulas (9a) and (9b), when the refractive index $n_1$ of the prism 20 is greater than the refractive index $n_0$ of the surrounding medium, then the refractive index $n_1$ of the prism 20, the angle of inclination $\phi_0$ of the first surface 21, and the tilted angle of $\phi_1$ of the second surface 22 may be appropriately designed such that the absolute value of the emission angle $|\theta_5|$ is greater than the absolute value of the incident angle $|\theta_2|$. On the other hand, when the refractive index $n_1$ of the prism 20 is less than the refractive index $n_0$ of the surrounding medium, then the refractive index $n_1$ of the prism 20, the angle of inclination $\phi_0$ of the first surface 21, and the angle of inclination $\phi_1$ of the second surface 22 may be appropriately designed such that the absolute value of the emission angle $|\theta_5|$ is less than the absolute value of the incident angle $|\theta_2|$. By this means, the absolute value of the magnification rate $M_p$ of the angular dispersion caused by the prism 20 will be greater than 1, and hence the angular dispersion $D_t$ of the optical component 1 as a whole will be greater than the angular dispersion $D_g$ created by the diffraction grating element 10 alone.

Next, the decrease in temperature dependence of the emission angle $\theta_5$ of the light emitted from the second surface 22 of the prism 20 will be explained. In the optical component 1, the temperature coefficient $F_t$ of the emission angle $\theta_5$ of the light emitted from the second surface 22 of the prism 20 is expressed by the following formula (10).

$$F_1 = \frac{\partial \theta_5}{\partial T} = M_p F_g + F_p \tag{10}$$

Here, $F_p$ is the temperature coefficient of the emission angle $\theta_5$ of the light emitted from the second surface 22 of the prism 20, when it is assumed that the incident angle $\theta_2$ of the light incident on the first surface 21 of the prism 20 is fixed, regardless of the temperature. This temperature coefficient $F_p$ is expressed by the following formula (11).

$$F_p = M_p \frac{\sin\phi_1}{\cos\theta_2 \cos\theta_4} \frac{d}{dT}\left(\frac{n_1}{n_0}\right) \tag{11}$$

Therefore, from the formula (10), it can be seen that if the following relationship (12a) or (12b) is satisfied, then the absolute value of the temperature coefficient $F_t$ of the emission angle $\theta_5$ of the light emitted from the second surface 22 of the prism 20 in the optical component 1 will be smaller than the absolute value of the product of the temperature coefficient $F_g$ of the emission angle $\theta_1$ of the light emitted from the diffraction grating element 10, multiplied by the magnification rate $M_p$ of the angular dispersion caused by the prism 20.

$$-2M_p F_g < F_p < 0 \tag{12a}$$

$$-2M_p F_g > F_p > 0 \tag{12b}$$

Furthermore, it is preferable that the following formula (13) is satisfied at any temperature within the temperature range of −20° C. and +80° C.

$$F_p = -M_p F_g \tag{13}$$

In this case, the absolute value of the temperature coefficient $F_t$ of the emission angle $\theta_5$ of the light emitted from the second surface 22 of the prism 20 in the optical component 1 becomes zero at the temperature at which formula (13) is satisfied, and furthermore, it assumes a small value within the temperature range indicated above.

When the optical component 1 is used in WDM (Wavelength Division Multiplexing) optical communications, the absolute value of the ratio $(F_t/D_t)$ represented by the following formula (14) is preferably small at any temperature within the temperature range of −20° C. to +80° C.

$$\left|\frac{F_1}{D_1}\right| = \left|\frac{F_g}{D_g} + \frac{F_p}{M_p D_g}\right| \tag{14}$$

Here, the ratio $(F_t/D_t)$ represents the temperature dependence of the wavelength of the light arriving at a certain observation point after emission from the prism 20.

For example, when the optical frequency spacing of the signal light is 100 GHz, it is preferable that the absolute value of the ratio $(F_t/D_t)$ is less than 0.4 pm/° C. (=40 pm/100° C.) at any temperature within the temperature range between −20° C. and +80° C. Moreover, when the optical frequency spacing of the signal light is 50 GHz, it is preferable that the absolute value of the ratio $(F_t/D_t)$ is less than 0.2 pm/° C. (=20 pm/100° C.) at any temperature in the temperature range between −20° C. and +80° C.

Next, the decrease in the temperature dependence of the angular dispersion $D_t$ of the emission angle $\theta_5$ of the light emitted from the second surface 22 of the prism 20 will be explained. Even when the temperature dependence of the emission angle $\theta_5$ of the light emitted from the second surface 22 of the prism 20 is decreased as described above, there is a case that the emission angle $\theta_5$ for a predetermined wavelength will change significantly. Namely, when the temperature dependence of the angular dispersion $D_t$ of the emission angle $\theta_5$ is large, and when there is a variation in temperature, although the emission angle $\theta_5$ for any particular wavelength will be approximately the same, the emission angle $\theta_5$ for other wavelengths will change significantly. Therefore, it is preferable that the temperature dependence of the angular dispersion $D_t$ is also small.

The temperature coefficient $G_t$ of the angular dispersion $D_t$ of the emission angle $\theta_5$ of the light emitted from the second surface 22 of the prism 20 is represented by the following formulas (15a) and (15b).

$$G_t = \frac{\partial D_t}{\partial T} = M_p G_g + H_t D_g \tag{15a}$$

$$H_t = A_p + B_p F_t = \frac{\partial M_p}{\partial T} \tag{15b}$$

Here, $H_t$ is the temperature coefficient of the magnification rate $M_p$ of the angular dispersion caused by the prism 20.

Moreover, the parameters $A_p$ and $B_p$ in the formula (15b) for the temperature coefficient $H_t$ are respectively expressed by the following formulas (16a) and (16b).

$$A_p = F_p\left(\tan\theta_2 + \frac{n_0 \cos\theta_2}{n_1 \cos\theta_3}\tan\theta_4\right) \tag{16a}$$

$$B_p = M_p \tan\theta_5 - \tan\theta_2 + (\tan\theta_3 - \tan\theta_4)\frac{\bar{n}_0 \cos\theta_2}{n_1 \cos\theta_3} \tag{16b}$$

Since the temperature coefficient $F_t$ is already a sufficiently small value, in the formulas (15a) and (15b), the item containing the temperature coefficient $F_t$ as a factor can be ignored.

Also, when the following relationship (17a) or (17b) is satisfied, then the absolute value of the temperature coefficient $G_t$ of the angular dispersion $D_t$ of the emission angle $\theta_5$ of the light emitted from the second surface 22 of the prism 20 in the optical component 1 will be less than the absolute value of the product of the temperature coefficient $G_g$ of the angular dispersion $D_g$ of the emission angle $\theta_1$ of the light emitted from the diffraction grating element 10, multiplied by the magnification rate $M_p$ of the angular dispersion caused by the prism 20.

$$-2M_p G_g < H_t D_g < 0 \tag{17a}$$

$$-2M_p G_g > H_t D_g > 0 \tag{17b}$$

Furthermore, it is preferable that the following formula (18) is satisfied at any temperature within the temperature range of $-20°$ C. to $+80°$ C.

$$-M_p G_g = H_t D_g \tag{18}$$

In this case, the absolute value of the temperature coefficient $G_t$ of the angular dispersion $D_t$ of the emission angle $\theta_5$ of the light emitted from the second surface 22 of the prism 20 in the optical component 1 will become zero at the temperature where the formula (18) is satisfied, and it will have a small value within the temperature range indicated above.

When the optical component 1 is used in WDM-based optical communications, it is preferable that the absolute value of the ratio $(G_t/D_t)$ is small at any temperature within the temperature range of $-20°$ C. to $+80°$ C. Here, the ratio $(G_t/D_t)$ represents the temperature dependence of the wavelength band of the light arriving at a particular observation region after emission from the prism 20.

For example, in the case that the waveband of the signal light is C-band (1.53 μm to 1.565 μm), when the optical frequency spacing of the signal light is 100 GHz, the absolute value of the ratio $(G_t/D_t)$ is preferably 11.4 pm/° C./μm (=0.4 pm/° C./(1.565 μm to 1.53 μm)) or less. Moreover, when the optical frequency spacing of the signal light is 50 GHz, the absolute value of the ratio $(G_t/D_t)$ is preferably 5.7 pm/° C./μm (=0.2 pm/° C./(1.565 μm to 1.53 μm)) or less.

In the case that the waveband of the signal light is L-band (1.565 μm to 1.625 μm), when the optical frequency spacing of the signal light is 100 GHz, the absolute value of the ratio $(G_t/D_t)$ is preferably 6.7 pm/° C./μm or less. Moreover, when the optical frequency spacing of the signal light is 50 GHz, the absolute value of the ratio $(G_t/D_t)$ is preferably 3.3 pm/° C./μm or less.

Furthermore, in the case that the waveband of the signal light contains both of C-band and L-band, when the optical frequency spacing of the signal light is 100 GHz, the absolute value of the ratio $(G_t/D_t)$ is preferably 4.2 pm/° C./μm or less. Moreover, when the optical frequency spacing of the signal light is 50 GHz, the absolute value of the ratio $(G_t/D_t)$ is preferably 2.1 pm/° C./μm or less.

As described above, it is possible to increase the absolute value of the angular dispersion $D_t$ of the emission angle $\theta_5$ in the optical component 1, and it is also possible to reduce the absolute value of the temperature coefficient $F_t$ of the emission angle $\theta_5$. Furthermore, the optical component 1 can reduce the absolute value of the temperature coefficient $G_t$ of the angular dispersion $D_t$. The refractive index $n_1$ of the prism 20, the temperature coefficient of the refractive index $n_1$, the tilted angle of $\phi_0$ of the first surface 21, and the angle of inclination $\phi_1$ of the second surface 22, may be appropriately designed such that the above-mentioned various relationships are satisfied.

When there is a reflected return light propagating from the prism 20 to the diffraction grating element 10, the diffraction efficiency will be degraded by interference of the light. Therefore, the prism 20 or the diffraction grating element 10 are preferably processed in order to reduce reflections. For example, light reflection of the used diffraction order may be reduced by means of an anti-reflection coat provided on the surface of the prism 20. Additionally, the width of the prism 20 may be adjusted, or the light may be cut by slits, in such a manner that light of other orders does not enter into the prism 20. Furthermore, it is preferable that the position and angle of the reflected light is offset by adjusting the angle and position of the prism 20, in such a manner that no interference of the light occurs.

Next, samples 1 to 4 of the optical component 1 according to the first embodiment will be explained. Of these, in each of samples 1 to 3, the diffraction grating element 10 is composed of silica is glass, the grating period Λ is 1.012 μm, the thermal expansion coefficient of the grating period Λ is $5 \times 10^{-7}/°$ C., the surrounding medium is atmospheric air ($n_0 = 1$), and the thermal coefficient of the refractive index $n_0$ of the surrounding medium at a temperature of 30° C. $(1/n_0 \cdot dn_0/dT)$ is $-8.6 \times 10^{-7}/°$ C. Moreover, at the time that light with a central wavelength of 1.55 μm is incident on the diffraction grating element 10, and the incident angle thereof $\theta_0$ is 50 degrees. In this case, as focusing the diffraction grating element 10 alone, the diffraction angle $\theta_1$ of the minus-first-order light is $-50.0°$, the angular dispersion $D_g$ in the diffraction grating element 10 is $-88.1$ deg./μm, the temperature coefficient $F_g$ of the diffraction angle $\theta_1$ is $-4.90 \times 10^{-5}$ deg./° C., the temperature coefficient $G_g$ of the angular dispersion $D_g$ is $-1.21 \times 10^{-4}$ deg./μm/° C., the amount of wavelength shift $(F_g/D_g)$ is 0.556 pm/° C., and the amount of change in the waveband $(G_g/D_g)$ is 1.38 pm/° C./μm.

In Sample 1, the prism 20 is composed of S-PHM52 glass manufactured by Ohara Ltd. This glass has a refractive index $n_1$ of 1.60, and a temperature coefficient of the refractive index $n_1(1/n_1 \cdot dn_1/dT)$ of $-3.42 \times 10^{-6}/°$ C. The respective parameters required in order to satisfy the above-mentioned formulas (9a), (9b), (13) and (18) were determined to be as follows. The angle of inclination $\phi_0$ of the first surface 21 is $-2.37°$, the angle of inclination $\phi_1$ of the second surface 22 of the prism 20 is $-5.94°$, the incident angle $\theta_2$ of the light incident on the first surface 21 of the prism 20 is $-52.4°$, and the emission angle $\theta_5$ of the light emitted from the second surface 22 of the prism 20 is $-68.7°$. In the optical component 1 as a whole, the angular dispersion $D_t$ of the emission angle $\theta_5$ of the light emitted from the second surface 22 of the prism 20 is $-139$ deg./μm, the temperature coefficient $F_t$ of the emission angle $\theta_5$ is approximately 0 deg./° C., and the temperature coefficient $G_t$ of the angular dispersion $D_t$ is approximately 0 deg./μm/° C. The wavelength shift $(F_t/D_t)$ is approximately 0 pm/° C., and the change in the waveband $(G_t/D_t)$ is approximately 0 pm/° C./μm. Moreover, the magnification rate $M_p$ of the angular dispersion caused by the prism 20 is 1.57. In this way, in Sample 1, it is possible to increase the absolute value of the angular dispersion $D_t$, whilst also being able to reduce both the temperature coefficient $F_t$ of the emission angle $\theta_5$ and the temperature coefficient $G_t$ of the angular dispersion $D_t$ virtually to zero, thus removing the need for a temperature control mechanism, or making it possible to simplify the same.

Sample 2 is similar to Sample 1 in view of the fact that the prism 20 is made from S-PHM52 glass manufactured by Ohara Ltd., but here the tilted angle $\phi_0$ of the first surface 21 of the prism 20 is taken to be 0°. The respective parameters satisfying the above-mentioned formulas (9a), (9b) and (13) were determined to be as follows. The tilted angle $\phi_1$ of the second surface 22 of the prism 20 is −6.31°, the incident angle $\theta_2$ of the light incident on the first surface 21 of the prism 20 is −50.0°, and the emission angle $\theta_5$ of the light emitted from the second surface 22 of the prism 20 is −66.3°. In the optical component 1 as a whole, the angular dispersion $D_t$ of the emission angle $\theta_5$ of the light emitted from the second surface 22 of the prism 20 is −132 deg./µm, the temperature coefficient $F_t$ of the emission angle $\theta_5$ is approximately 0 deg./° C., and the temperature coefficient $G_t$ of the angular dispersion $D_t$ is approximately −1.13×10$^{-5}$ deg./µm/° C. The wavelength shift ($F_t/D_t$) is approximately 0 pm/° C., and the change in the waveband ($G_t/D_t$) is approximately 0.09 pm/° C./µm. Moreover, the magnification rate $M_p$ of the angular dispersion caused by the prism 20 is 1.50. In this way, in Sample 2, it is possible to increase the absolute value of the angular dispersion $D_t$, whilst being able to reduce the temperature coefficient $F_t$ of the emission angle $\theta_5$ virtually to zero, and to reduce the temperature coefficient $G_t$ of the angular dispersion $D_t$ to a very small value, thus removing the need for a temperature control mechanism, or making it possible to simplify the same.

In Sample 3, the glass composition of the prism 20 is adjusted by optimizing the refractive index $n_1$ and the temperature coefficient of the refractive index. For example, the refractive index $n_1$ of the glass material of the prism 20 is set to be 1.44 and the temperature coefficient of this refractive index is set to be −3.58×10$^{-6}$/° C. The respective parameters for satisfying the above-mentioned formulas (9a), (9b), (13) and (18) were determined to be as follows. The tilted angle $\phi_0$ of the first surface 21 of the prism 20 is 0°, the tilted angle $\phi_1$ of the second surface 22 of the prism 20 is −6.31°, the incident angle $\theta_2$ of the light incident on the first surface 21 of the prism 20 is −50.0°, and the emission angle $\theta_5$ of the light emitted from the second surface 22 of the prism 20 is −63.5°. In the optical component 1 as a whole, the angular dispersion $D_t$ of the emission angle $\theta_5$ of the light emitted from the second surface 22 of the prism 20 is −118 deg./µm, the temperature coefficient $F_t$ of the emission angle $\theta_5$ is approximately 0 deg./° C., and the temperature coefficient $G_t$ of the angular dispersion $D_t$ is approximately 0 deg./µm/° C. The wavelength shift ($F_t/D_t$) is approximately 0 pm/° C., and the change in the waveband ($G_t/D_t$) is approximately 0 pm/° C./µm. Moreover, the magnification rate $M_p$ of the angular dispersion caused by the prism 20 is 1.33. In this way, in Sample 3, it is possible to increase the absolute value of the angular dispersion $D_t$, whilst being able to reduce both of the temperature coefficient $F_t$ of the emission angle $\theta_5$ and the temperature coefficient $G_t$ of the angular dispersion $D_t$ virtually to zero, thus removing the need for a temperature control mechanism, or making it possible to simplify the same.

Figure 2:
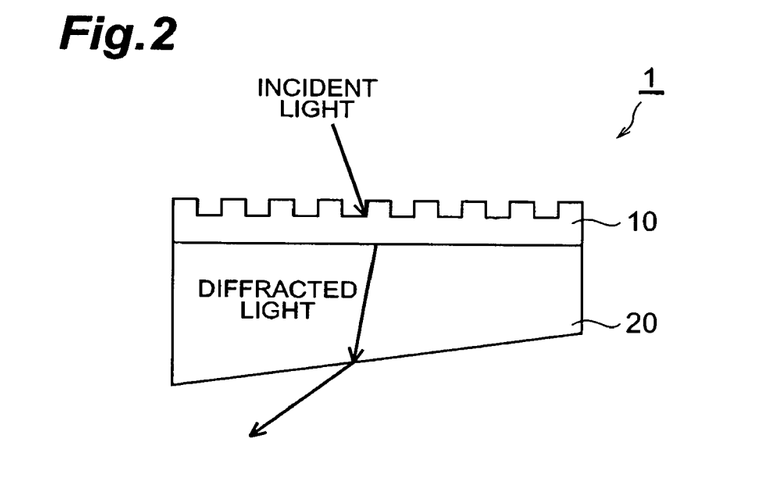
FIG. 2 is a view showing a configuration of a second embodiment of an optical component according to the present invention.

In the Sample 2 and Sample 3 described above, since the tilted angle $\theta$ o of the first surface 21 of the prism 20 is 0°, and the first surface 21 of the prism 20 and the lower face of the diffraction grating element 10 are mutually parallel. That is, as shown in FIG. 2, the first surface 21 of the prism 20 and the lower face of the diffraction grating element 10 are bonded together. FIG. 2 is a view showing a configuration of a second embodiment of an optical component according to the present invention, and in the second embodiment, the diffraction grating element 10 is attached on the first surface 21 of the prism 20 through an adhesive. By adopting this composition, the optical component 1 becomes easy to manufacture and handle. Furthermore, at the time that the diffraction grating element 10 and the prism 20 are bonded in this way, it is preferable that there should be zero difference (or very small difference) between the respective linear thermal expansivity values of the diffraction grating element 10 and the prism 20, and by adopting a composition of this kind, it is possible to achieve performance characteristics that match the design described above.

Furthermore, in the diffraction grating element 10 according to Samples 1 to 3 described above, the temperature coefficient of the product ($n_0\Lambda$) expressed by the following formula (19) is −3.6×10$^{-7}$/° C., which is distinctive in that it is a negative value.

$$\frac{1}{n_0\Lambda}\frac{d}{dT}(n_0\Lambda) = \frac{1}{n_0}\frac{dn_0}{dT} + \frac{1}{\Lambda}\frac{d\Lambda}{dT} \tag{19}$$

Additionally, in order to counteract this temperature dependence, the prism 20 is also characterized in that it has a negative value for the temperature coefficient of the ratio ($n_1/n_0$) as expressed by the following formula (20).

$$\frac{1}{n_1/n_0}\frac{d}{dT}\left(\frac{n_1}{n_0}\right) = \frac{1}{n_1}\frac{dn_1}{dT} - \frac{1}{n_0}\frac{dn_0}{dT} \tag{20}$$

In following Sample 4, the temperature coefficient of the product ($n_0\Lambda$) is positive. The greater the ratio between the refractive index $n_0$ of the surrounding medium and the refractive index of the material constituting the diffraction grating element 10, the greater the diffraction efficiency, even when the height of the bars and grooves of the diffraction grating is low, and therefore the easier it is to manufacture the diffraction grating. However, glass with a high refractive index generally has a coefficient of linear expansion of 5×10$^{-6}$/° C. or more, and therefore the temperature coefficient of the product ($n_0\Lambda$) is positive.

In Sample 4, the grating period $\Lambda$ is 1.012 µm, the coefficient of linear expansion of the grating period $\Lambda$ is 6.6×10$^{-6}$/° C., the surrounding medium is atmospheric air ($n_0$=1), and the temperature coefficient of the refractive index $n_0$ of the surrounding medium at a temperature of 30° C. is −8.6×10$^{-7}$/° C. Furthermore, light of central wavelength 1.55 µm is incident on the diffraction grating element 10, and the incident angle $\theta_0$ in this case is 50°. Here, in the diffraction grating element 10 alone, the diffraction angle of the minus-first-order light $\theta_1$ is −50.0°, the angular dispersion $D_g$ of the diffraction grating element 10 is −88.1 deg./µm, the temperature coefficient $F_g$ of the diffraction angle $\theta_1$ is 7.84×10$^{-4}$ deg./° C., the temperature coefficient $G_g$ of the angular dispersion $D_g$ is 1.94×10$^{-3}$ deg./µm/° C., the wavelength shift ($F_g/D_g$) is −8.90 pm/° C., and the amount of change in the waveband ($G_g/D_g$) is −22.1 pm/° C./µm.

In Sample 4, the absolute value of the temperature coefficient of the product ($n_0\Lambda$) is at least one order of ten greater than in the case of silica glass, and therefore, the absolute value of the temperature coefficient of the refractive index $n_1$ of the prism 20 must also be at least one order of ten greater than in the case of silica glass. Therefore, it is preferable that the material of the prism 20 is a semiconductor material, and in particular, is preferably silicon. Silicon has a refractive index of 3.48 and the thermal coefficient of this refractive index is 45.7×10$^{-6}$/° C. The respective parameters required in order to satisfy the above-mentioned formulas (9a), (9b), (13) and (18), when the prism 20 is composed of silicon, were determined to be as follows.

The tilted angle $\phi_0$ of the first surface 21 of the prism 20 is −7.41°, the tilted angle $\phi_1$ of the second surface 22 of the prism 20 is −2.50°, the incident angle $\theta_2$ of the light incident on the first surface 21 of the prism 20 is −57.4°, and the emission angle $\theta_5$ of the light emitted from the second surface 22 of the prism 20 is −81.5°. In the optical component 1 as a whole, the angular dispersion $D_t$ of the emission angle $\theta_5$ of the light emitted from the second surface 22 of the prism 20 is −319 deg./μm, the temperature coefficient $F_t$ of the emission angle $\theta_5$ is approximately 0 deg./° C., and the temperature coefficient $G_t$ of the angular dispersion $D_t$ is approximately 0 deg./μm/° C. The wavelength shift ($F_t/D_t$) is approximately 0 pm/° C., and the change in the waveband ($G_t/D_t$) is approximately 0 pm/° C./μm. Moreover, the magnification rate $M_p$ of the angular dispersion caused by the prism 20 is 3.62.

In this way, in Sample 4 as well, it is possible to increase the absolute value of the angular dispersion $D_t$, whilst being able to reduce both the temperature coefficient $F_t$ of the emission angle $\theta_5$ and the temperature coefficient $G_t$ of the angular dispersion $D_t$ virtually to zero, thus removing the need for a temperature control mechanism, or making it possible to simplify same. In particular, in Sample 4, by using a semiconductor material having a high absolute value for the temperature coefficient of the refractive index $n_1$ as the material for the prism 20, it is possible to use optical glass having a large coefficient of linear expansion as the material for the diffraction grating element 10. Since optical glass having a large coefficient of linear expansion has a high refractive index, by using the optical glass, it is possible readily to manufacture a diffraction grating element 10 having high diffraction efficiency, even when the bars and grooves of the diffraction grating are low in height.

Moreover, it is also possible to use another semiconductor as the material for the prism 20, and in addition to Si (which has a thermal coefficient of refractive index=45.7×10$^{-6}$/° C.), it would also be appropriate to use, for example, ZnS (thermal coefficient of refractive index=19.4×10$^{-6}$/° C.), InP (thermal coefficient of refractive index=27×10$^{-6}$/° C.), GaAs (thermal coefficient of refractive index= 59×10$^{-6}$/° C.), ZnSe (thermal coefficient of refractive index=52×10$^{-6}$/° C.), InGaAsP (thermal coefficient of refractive index=65×10$^{-6}$/° C.), or the like. The thermal coefficients of the refractive index of thus various semiconductors at the used wavelength in optical communications, and in all cases, they have a larger absolute value than standard optical glass.

In the foregoing, the optical component 1 was described which functions as an optical demultiplexer, but when the light propagates in the opposite direction to that described above, then this optical component 1 can function as an optical multiplexer.

Figure 3:
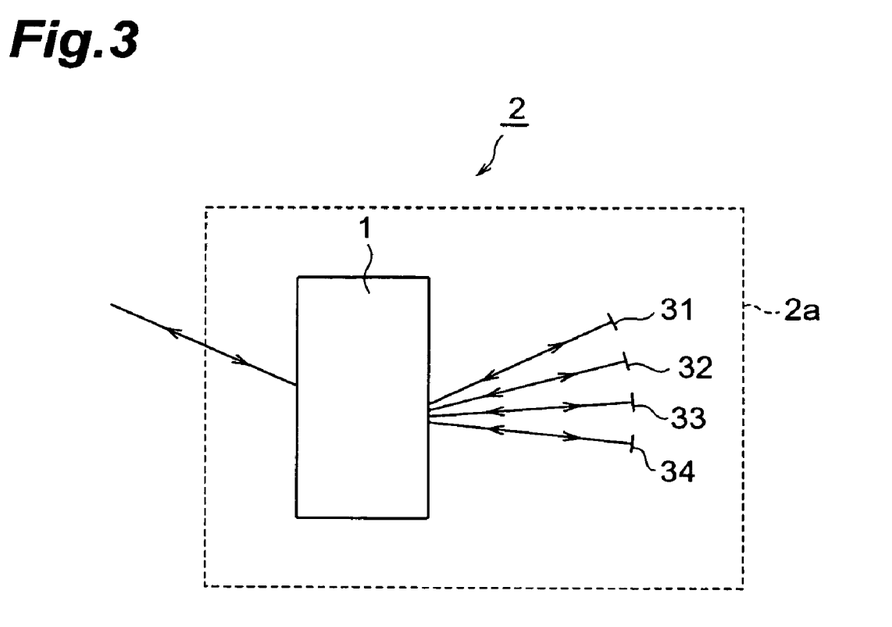
FIG. 3 is a view showing a configuration of a first embodiment of an optical device according to the present invention.

FIG. 3 is a view showing a configuration of a first embodiment of an optical device according to the present invention. As shown in FIG. 3, when the optical component 1 is used together with mirror reflectors 31 to 34 which reflect the light emitted from the second surface 22 of the prism 20. In the optical device 2, the optical component 1 can be hermetically sealed within the housing 2a. The optical device 2, including the optical component 1 and the mirror reflectors 31 to 34, first demultiplexes the incident light by means of the optical component 1, and then reflects the light of various wavelengths thus split, by means of the mirror reflectors 31 to 34, and multiplexes the light thus reflected, by means of the optical component 1. In this time, by establishing a suitable optical path length for each wavelength from demultiplexing until multiplexing (in other words, by setting the mirror reflectors 31 to 34 in suitable positions), the optical device 2 can be used as a dispersion adjuster for adjusting the group delay time of light of respective wavelengths. In this case, the optical device 2 is used with an optical circulator (see FIG. 6).

Figure 4:
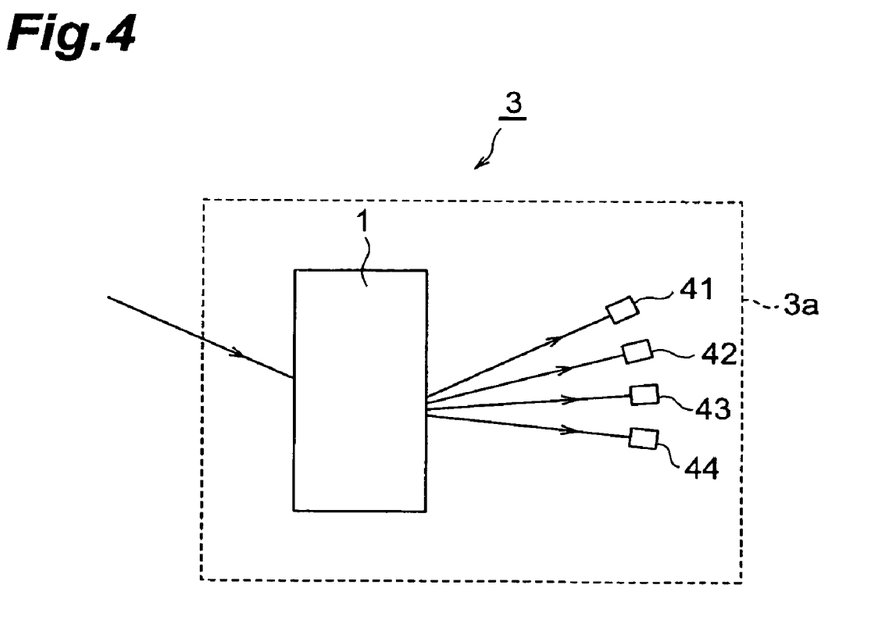
FIG. 4 is a view showing a configuration of a second embodiment of an optical device according to the present invention.

FIG. 4 is a view showing a configuration of a second embodiment of an optical device according to the present invention. As shown in FIG. 4, the optical component 1 is used together with photoreceptor elements 41 to 44 which detect the optical power emitted from the second surface 22 of the prism 20, then an optical device 3 including the optical component 1 and the photoreceptor elements 41 to 44 can be used as a spectral detector for detecting the optical power at respective wavelengths. In the optical device 3, the optical component 1 can be also hermetically sealed within the housing 3a.

Figure 5:
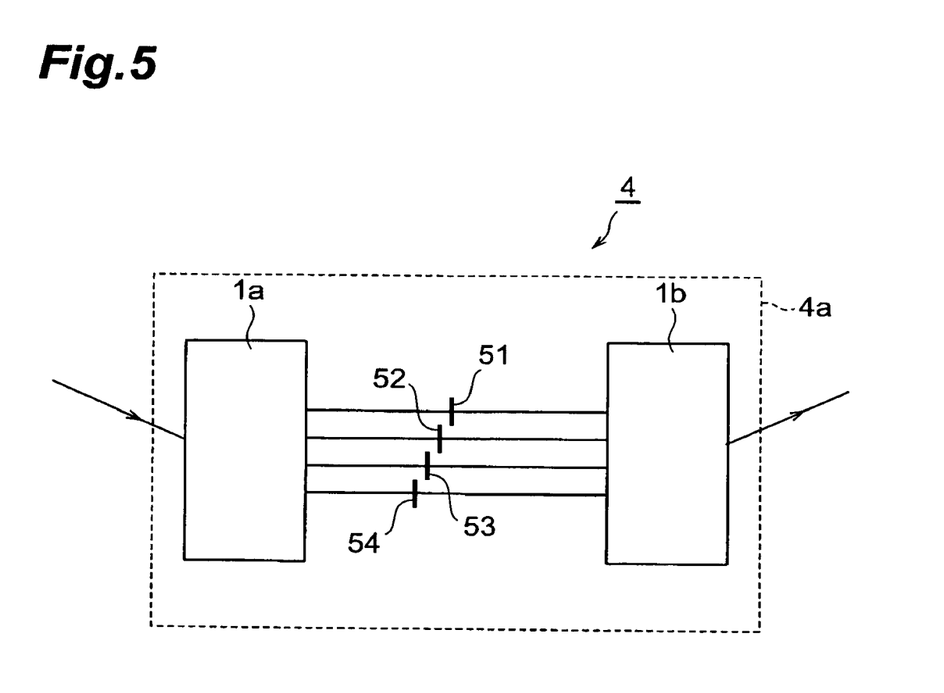
FIG. 5 is a view showing a configuration of a third embodiment of an optical device according to the present invention.

Furthermore, FIG. 5 is a view showing a configuration of a third embodiment of an optical device according to the present invention. As shown in FIG. 5, the optical device 4, including two optical components 1a, 1b having the same configuration as the optical component 1, and optical attenuators 51 to 54, demultiplexes the incident light by using the optical component 1a (optical demultiplexer), applies a predetermined loss to each of the demultiplexed wavelengths by using the optical attenuators 51 to 54, and multiplexes the light of respective wavelengths by using the optical component 1b (optical multiplexer). In the optical device 4, the optical components 1a and 1b can be hermetically sealed within the housing 4a. The optical device 4 may be used as an optical filter, and it may also be used as a gain equalizer for equalizing the gain of an optical amplifier. In the configuration shown in FIG. 3, when optical attenuators are inserted between the optical component 1 and the mirror reflectors 31 to 34, then it is also possible to achieve an optical filter.

As described above, the optical device including the optical component 1 can be used suitably in a WDM optical communications system, as an optical demultiplexer, optical multiplexer, dispersion adjuster, spectral detection device, and optical filter, and the like. Additionally, these optical devices may also include semiconductor components, such as a laser diode, photodiode, MEMS (Micro Electro Mechanical System), or the like. In general, a semiconductor component is sealed hermetically in order to prevent degradation caused by the effects of hydrogen gas, water vapor, or the like. Even in an optical device which does not include semiconductor components, by hermetically sealing the device, it is possible to maintain good characteristics, by suppressing the adherence of foreign matter to the diffraction grating element 10 or prism 20.

In the following, specific examples of decrease in the temperature dependence of the diffraction characteristics achieved by hermetic sealing are described. The refractive index n of a gas is generally represented by the following formula (21).

$$n = 1 + \Delta n \quad (21)$$

Here, Δn indicates the difference with respect to the refractive index in a vacuum, which varies depending on the gas concerned, and the respective values for He, Ne, Ar and $N_2$ at a temperature of 0° C. and pressure of 1 atmosphere are as follows:

| He | $\Delta n = 0.35 \times 10^{-4}$ | (22a) |
| Ne | $\Delta n = 0.67 \times 10^{-4}$ | (22b) |
| Ar | $\Delta n = 2.84 \times 10^{-4}$ | (22c) |
| $N_2$ | $\Delta n = 2.97 \times 10^{-4}$ | (22d) |

When the temperature or pressure changes, then the value of $\Delta n$ changes approximately in direct proportion to the density of the gas. The gas density when hermetically sealed is taken to be $\rho_0$, the gas temperature when hermetically sealed is taken to be $T_0$, and the coefficient of volumetric expansion of the gas is taken to be $\gamma$. In this case, the refractive index n of the gas when the temperature is T is expressed by the following formula (23) and the density $\rho$ of the gas when the temperature is T is expressed by the following formula (24).

$$n = 1 + \Delta n \frac{\rho}{\rho_0} \quad (23)$$

$$\frac{\rho}{\rho_0} = 1 - \gamma(T - T_0) \quad (24)$$

Therefore, the temperature coefficient $\beta$ of the refractive index of the hermetically sealed gas will be represented by the following formula (25).

$$\beta = \frac{1}{n}\frac{dn}{dT} \approx -\Delta n \gamma \quad (25)$$

When the material of the housing in which the optical component 1 (or semiconductor component) is accommodated and sealed is aluminum, then the coefficient of linear expansion of the enclosure is $23\times10^{-6}/°$ C., and therefore the coefficient of volumetric expansion $\gamma$ is $69\times10^{-6}/°$ C. ($=3\times23\times10^{-6}$). Accordingly, the temperature coefficient $\beta$ of the refractive index of the hermetically sealed gas will be $-0.024\times10^{-7}/°$ C., in the case of He gas, and $-0.20\times10^{-7}/°$ C. in the case of $N_2$ gas.

The absolute value of this temperature coefficient $\beta$ of the refractive index of the hermetically sealed gas is at least one order of ten less than the coefficient of linear expansion ($5\times10^{-7}/°$ C.) of the silica glass. Furthermore, at atmospheric pressure, the coefficient of volumetric expansion of the gas is inversely proportional to the absolute temperature, and if the temperature is 0° C., for example, then it have a value of $3.7\times10^{-3}/°$ C. ($=1/273$), and hence the absolute value of the coefficient of volumetric expansion $\gamma$ of the gas hermetically sealed in an aluminum housing will be at least two orders of ten smaller than the coefficient of volumetric expansion of the gas in atmospheric conditions.

That is, when sealed hermetically by means of the housing composed of a material having a high coefficient of linear expansion, such as aluminum, then the temperature dependence of the refractive index $n_0$ of the medium (generally, a gas) surrounding the diffraction grating element 10 and the prism 20, including a vacuum, will be so small that it can be ignored. In the case that the component is sealed, when the material surrounding the diffraction grating element 10 and the prism 20 is one having a high coefficient of linear expansion, such as resin, then it is necessary to satisfy the formulas (9a), (9b), (12a) and (12b) as considering the thermal coefficient $\beta$ of the refractive index of the gas while hermetically sealing.

Next, a sample of an optical component which is hermetically sealed in this manner will be described. In the present sample, the diffraction grating element 10 and the prism 20 are disposed inside a housing of a material having a lower coefficient of linear expansion than aluminum, and are sealed therein. The diffraction grating element 10 is composed of silica glass, the grating period $\Lambda$ is 1.012 $\mu$m, the coefficient of linear expansion of the grating period $\Lambda$ is $5\times10^{-7}/°$ C., and refractive index $n_0$ of the surrounding medium is 1, and the temperature coefficient of the refractive index $n_0$ of the surrounding medium is so small as to be negligible. Moreover, light with a central wavelength 1.55 $\mu$m is introduced into the diffraction grating element 10, and the incident angle $\theta_0$ in this case is 50°. In the diffraction grating element 10 alone, the diffraction angle $\theta_1$ of the minus-first-order light is $-50.0°$, the angular dispersion $D_g$ in the diffraction grating element 10 is $-88.1$ deg./$\mu$m, the temperature coefficient $F_g$ of the diffraction angle $\theta_1$ is $6.83\times10^{-5}$ deg./° C., the temperature coefficient $G_g$ of the angular dispersion $D_g$ is $1.69\times10^{-4}$ deg./$\mu$m/° C., the amount of wavelength shift ($F_g/D_g$) is $-0.775$ pm/° C., and the amount of change in the waveband ($G_g/D_g$) is $-1.92$ pm/° C./$\mu$m.

The prism 20 is composed of silica glass. This silica glass has a refractive index $n_1$ of 1.45, and a temperature coefficient of the refractive index $n_1(1/n_1 \cdot dn_1/dT)$ of $6\times10^{-6}/°$ C. The tilted angle $\phi_0$ of the first surface 21 of the prism 20 is 0°. The respective parameters required in order to satisfy the formulas (9a), (9b) and (13) were determined to be as follows. The tilted angle $\phi_1$ of the second surface 22 of the prism 20 is $-4.09°$, the incident angle $\theta_2$ of the light incident on the first surface 21 of the prism 20 is $-50.0°$, and the emission angle $\theta_5$ of the light emitted from the second surface 22 of the prism 20 is $-58.4°$. In the optical component 1 as a whole, the angular dispersion $D_t$ of the emission angle $\theta_5$ of the light emitted from the second surface 22 of the prism 20 is $-103$ deg./$\mu$m, the temperature coefficient $F_t$ of the emission angle $\theta_5$ is approximately 0 deg./° C., and the temperature coefficient $G_t$ of the angular dispersion $D_t$ is approximately $4.98\times10^{-6}$ deg./$\mu$m/° C. The wavelength shift ($F_t/D_t$) is approximately 0 pm/° C., and the change in the waveband ($G_t/D_t$) is approximately $-0.04$ pm/° C./$\mu$m. Moreover, the magnification rate $M_p$ of the angular dispersion caused by the prism 20 is 1.17. In this way, in the present sample, it is possible to increase the absolute value of the angular dispersion $D_t$, whilst also being able to reduce the temperature coefficient $F_t$ of the emission angle $\theta_5$ virtually to zero, and to reduce the temperature coefficient $G_t$ of the angular dispersion $D_t$ to a very small value, thus removing the need for a temperature control mechanism, or making it possible to simplify the same.

In this sample, since the diffraction grating element 10 and the prism 20 are both made from the same material, then even when the diffraction grating element 10 and the prism 20 are bonded mutually together, it is possible to achieve performance that matches the designed characteristics, and the optical component 1 becomes easy to manufacture and handle. Moreover, the diffraction grating element 10 and the prism 20 may be formed in an integrated fashion, and a diffraction grating may be formed on one face of the prism.

Figure 6:
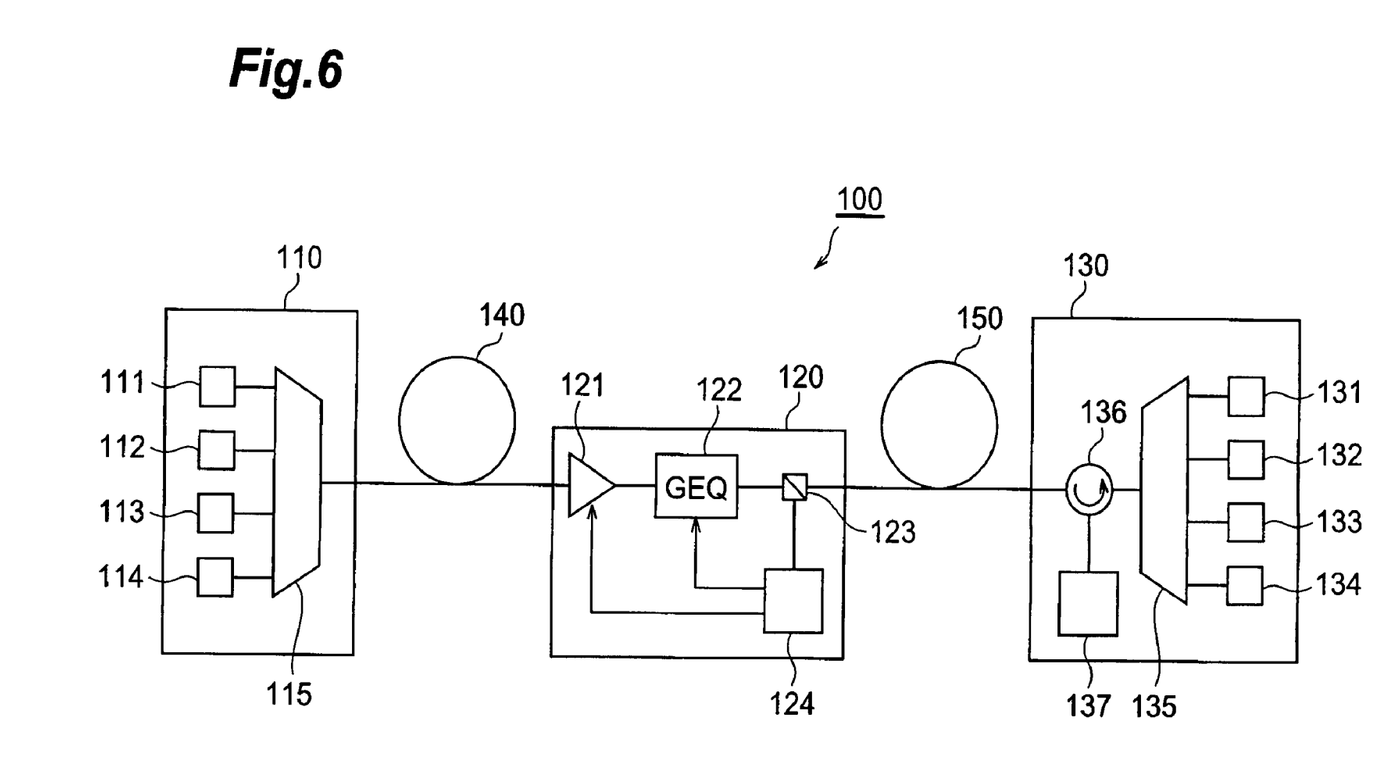
FIG. 6 is a view showing a configuration of one embodiment of an optical communications system according to the present invention.

Next, one embodiment of an optical communications system according to the present invention will be explained in detail with reference to FIG. 6. FIG. 6 is a view showing a configuration of an optical communications system according to the present invention. The optical communications system 100, as shown in FIG. 6, comprises an optical transmitter 110, an optical repeater 120 and an optical receiver 130. An optical fiber transmission line 140 is laid between the optical transmitter 110 and the optical repeater 120, and an optical fiber transmission line 150 is laid between the optical repeater 120 and the optical receiver 130.

The optical transmitter 110 comprises light sources 111 to 114 and an optical multiplexer 115. The light sources 111 to 114 output signal light of mutually different wavelengths. The optical multiplexer 115 multiplexes the signal light components emitted from the respective light sources 111 to 114, and outputs the multiplexed signal light to the optical fiber transmission line 140.

The optical repeater 120 comprises an optical amplifier 121, a gain equalizer 122, an optical coupler 123, and a spectral detector 124. The optical amplifier 121 inputs signal light that reaches it after propagating through the optical fiber transmission line 140, and outputs the amplified light. The gain equalizer 122 inputs the signal light outputted from the optical amplifier 121 and applies losses corresponding to wavelength to the signal light, thereby equalizing the gain of the amplifier 121. The optical coupler 123 separates a part of the signal light outputted from the gain equalizer 122 and outputs it to the spectral detector 124, whilst outputting the rest of the signal light to the optical fiber transmission line 150. The spectral detector 124 monitors the power of the signal light arriving from the optical coupler 123, for each wavelength. The respective operations of the optical amplifier 121 and the gain equalizer 122 are controlled on the basis of the monitoring results provided by the spectral detector 124.

The optical receiver 130 comprises photoreceptors 131 to 134, an optical demultiplexer 135, an optical circulator 136, and a dispersion adjuster 137. The optical circulator 136 inputs signal light arriving at it after propagating through the optical fiber transmission line 150, and outputs this signal light to the dispersion adjuster 137. Moreover, the optical circulator 136 inputs the signal light reaching it from the dispersion adjuster 137, and outputs this signal light to the optical demultiplexer 135. The optical demultiplexer 135 inputs the multiplexed signal light outputted from the dispersion adjuster 137, and demultiplexes this signal light into separate wavelengths. Thereafter, the signal light of each respective wavelength is outputted to the photoreceptors 131 to 134. The photoreceptors 131 to 134 receive the signal light arriving from the optical demultiplexer 135.

This optical communications system 100 operates as follows. In the optical transmitter 110, the signal light emitted by the respective light sources 111 to 114 is multiplexed by the optical multiplexer 115, and thereafter the multiplexed signal light is outputted to the optical fiber transmission line 140. At the optical repeater 120, the multiplexed signal light arriving after propagating through the optical fiber transmission line 140 is amplified by the optical amplifier 121, and the power at each wavelength is equalized by the gain equalizer 122. Additionally, the power of the signal light at each respective wavelength outputted to the optical fiber transmission line 150 is monitored by the spectral detector 124, and the operation of both the optical amplifier 121 and the gain equalizer 122 is controlled on this basis of the results of this monitoring, whereby, even when varying the number of channels of the signal light arriving at the optical repeater 120, or the like, the power of the signal light at each wavelength output to the optical fiber transmission line 150 will be equalized. In the optical receiver 130, the multiplexed signal light arriving the receiver after propagating through the optical fiber transmission line 150 is inputted via the optical circulator 136 to the dispersion adjuster 137, and dispersion of the light is compensated by the dispersion adjuster 137. And the compensated light is inputted to the optical demultiplexer 135 by way of the optical circulator 136. The multiplexed signal light inputted to the optical demultiplexer 135 is demultiplexed into respective wavelengths by the optical demultiplexer 135, and is then received by the photoreceptors 131 to 134.

In the optical communications system 100, the optical component 1 described above is used respectively as the optical multiplexer 115 and the optical demultiplexer 135, the optical device 4 is used as a gain equalizer 122, the optical device 3 described above is used as the spectral detector 124, and the optical device 2 described above is used as the dispersion adjuster 137. Therefore, since the emission angle from the optical component 1 has low temperature dependence, this optical communications system 1 does not require a temperature control mechanism, or alternatively, the temperature control mechanism thereof can be simplified. Moreover, since the absolute value of the angular dispersion of the optical component 1 is large, the respective devices can be made more compact in size.

As described in detail above, in accordance with the present invention, it is possible to increase the absolute value of the angular dispersion of the emission angle, whilst also being able to reduce the temperature dependence of the emission angle.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical component comprising:

a diffraction grating element of transmissive type having a flat plate, and a diffraction grating formed on one surface of said flat plate or formed within said flat plate in parallel with the one surface thereof; and a prism composed of a material with a refractive index of $n_1$, said prism having a first surface on which the light diffracted by said diffraction grating element is incident, and a second surface from which the light having passed through the first surface is emitted;

wherein said diffraction grating element and said prism are provided within a medium with a refractive index of $n_0$; and wherein, in the case that light with a wavelength $\lambda$ is incident on said diffraction grating element at an incident angle of $\theta_0$, then taking the incident angle of the light incident on the first surface of said prism, from said diffraction grating element, to be $\theta_2$, taking the emission angle of the light emitted from said second surface of said prism to be $\theta_5$, taking the temperature coefficient of the diffraction angle in said diffraction grating element to be $F_g$, taking the temperature coefficient of the emission angle $\theta_5$ of the light emitted from the second surface of said prism, assuming that the incident angle $\theta_2$ of the light incident on the first surface of said prism is fixed regardless of the temperature, to be $F_p$, and taking the magnification rate of the angular dispersion caused by said prism to be $M_p$, said diffraction grating element and said prism are arranged such that the wavelength $\lambda$ and the incident angle $\theta_0$ satisfy the following relationship:

"$n_1 > n_0$ AND $|\theta_5| > |\theta_2|$" or

"$n_1 < n_0$ AND $|\theta_5| < |\theta_2|$", whilst also satisfy the following relationship:

"$-2M_p F_g < F_p < 0$" or

"$-2M_p F_g > F_p > 0$".

2. An optical component according to claim 1, wherein said diffraction grating element and said prism are mutually separated by a predetermined distance, by means of said medium with the refractive index of $n_0$.

3. An optical component according to claim 1, wherein said diffraction grating element is attached to the first surface of said prism by means of an adhesive.

4. An optical component according to claim 1, wherein, in a temperature range of $-20°$ C. to $+80°$ C., said optical component satisfies the following relationship:

"$F_p = -M_p F_g$".

5. An optical component according to claim 1, wherein, taking the temperature coefficient of the emission angle $\theta_5$ of the light emitted from the second surface of said prism to be $F_t$, and taking the angular dispersion of the emission angle $\theta_5$ to be $D_t$, the absolute value of the ratio $(F_t/D_t)$ is less than 0.4 pm/° C. in a temperature range of $-20°$ C. to $+80°$ C.

6. An optical component according to claim 5, wherein, in a temperature range of $-20°$ C. to $+80°$ C., the absolute value of the ratio $(F_t/D_t)$ is less than 0.2 pm/° C.

7. An optical component according to claim 1, wherein, taking the angular dispersion of said diffraction grating element to be $D_g$, taking the temperature coefficient of the angular dispersion $D_g$ to be $G_g$, and taking the temperature coefficient of the magnification rate $M_p$ of the angular dispersion caused by said prism to be $H_t$, then said optical component satisfies the following relationship:

"$-2M_p G_g < H_t D_g < 0$" or

"$-2M_p G_g > H_t D_g < 0$".

8. An optical component according to claim 7, wherein, in a temperature range of $-20°$ C. to $+80°$ C., said optical component satisfies the following relationship:

"$-M_p G_g = H_t D_g$".

9. An optical component according to claim 1, wherein, taking the grating period of said diffraction grating to be $\Lambda$, then the temperature coefficient of the product ($n_0 \Lambda$) has a negative value, and the temperature coefficient of the ratio ($n_1/n_0$) has a negative value.

10. An optical component according to claim 1, wherein said prism is composed of a semiconductor.

11. An optical component according to claim 10, wherein said semiconductor is silicon.

12. An optical device including an optical component according to claim 1, wherein said optical device multiplexes or demultiplexes light by using said optical component.

13. An optical device according to claim 12, further comprising a housing hermetically sealing said optical component therein.

14. An optical communications system including an optical device according to claim 12, wherein said optical communications system transmits signal light, and multiplexes or demultiplexes it by using said optical device.

* * * * *